(12) United States Patent
Poutievski et al.

(10) Patent No.: US 8,904,041 B1
(45) Date of Patent: Dec. 2, 2014

(54) LINK LAYER ADDRESS RESOLUTION OF OVERLAPPING NETWORK ADDRESSES

(75) Inventors: Leon Poutievski, Santa Clara, CA (US); Barry Friedman, Sunnyvale, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 13/460,063

(22) Filed: Apr. 30, 2012

(51) Int. Cl.
*G06F 15/16* (2006.01)
(52) U.S. Cl.
USPC .......................................................... 709/245
(58) Field of Classification Search
None
See application file for complete search history.

(56) References Cited

U.S. PATENT DOCUMENTS

| | | | |
|---|---|---|---|
| 6,199,112 B1 * | 3/2001 | Wilson | 709/227 |
| 7,283,534 B1 * | 10/2007 | Kelly et al. | 370/395.54 |
| 7,293,077 B1 * | 11/2007 | Teo et al. | 709/221 |
| 7,631,100 B2 * | 12/2009 | Ben-Zvi et al. | 709/245 |
| 2005/0076145 A1 * | 4/2005 | Ben-Zvi et al. | 709/245 |
| 2008/0162516 A1 * | 7/2008 | Shinomiya | 707/100 |
| 2010/0138550 A1 * | 6/2010 | Lee et al. | 709/228 |
| 2011/0196967 A1 * | 8/2011 | Tachibana | 709/225 |

OTHER PUBLICATIONS

Retana, A., et al. "Using 31-Bit Prefixes on IPv4 Point-to-Point Links", Network Working Group, Request for 3021, Category: Standards Track, Dec. 2000 (10 pp).
Plummer, David C. "An Ethernet Address Resolution Protocol—or—Converting Network Protocol Addresses to 48.bit Ethernet Address for Transmission on Ethernet Hardware", Network Working Group, Request for Comments: 826, Nov. 1982 (10 pp).
Subnetwork, From Wikipedia, the free encyclopedia, http://en.wikipedia.org/wiki/Subnetwork, Nov. 23, 2011 (8 pp).
Address Resolution Protocol, From Wikipedia, the free encyclopedia, http://en. wikipedia.org/wiki/Address_Resolution_Protocol, Nov. 23, 2011 (6 pp).
Network address translation, From Wikipedia, the free encyclopedia, http://en.wikipedia.org/wiki/Network_address_translation, Apr. 11, 2012 (10 pp).

* cited by examiner

*Primary Examiner* — Brian P Whipple
(74) *Attorney, Agent, or Firm* — Young Basile Hanlon & MacFarlane P.C.

(57) ABSTRACT

A system, apparatus, and method for link layer address resolution of overlapping network addresses is disclosed. In one aspect, the method performed on a first device includes receiving a first address resolution request from a second device, the first address resolution request having a sender network address and a target network address, wherein the target network address is an overlapping network address that is a gateway address of the second device and a network address of a third device, creating a first address resolution response having a sender link layer address associated with the first device, and sending the first address resolution response to the second device.

20 Claims, 7 Drawing Sheets

| BIT OFFSET | 0 – 7 | 8 – 15 |
|---|---|---|
| 0 | HARDWARE TYPE (HTYPE) | |
| 16 | PROTOCOL TYPE (PTYPE) | |
| 32 | HARDWARE ADDRESS LENGTH (HLEN) | PROTOCOL ADDRESS LENGTH (PLEN) |
| 48 | OPERATION (OPER) | |
| 64 | SENDER HARDWARE ADDRESS (SHA) | |
| 80 | | |
| 96 | | |
| 112 | SENDER PROTOCOL ADDRESS (SPA) | |
| 128 | | |
| 144 | TARGET HARDWARE ADDRESS (THA) | |
| 160 | | |
| 176 | | |
| 192 | TARGET PROTOCOL ADDRESS (TPA) | |
| 208 | | |

FIG. 5A

| BIT OFFSET | 0 – 7 | 8 – 15 |
|---|---|---|
| 0 | 0x0001 | |
| 16 | 0x0800 | |
| 32 | 0x06 | 0x04 |
| 48 | 0X0001 (REQUEST) | |
| 64 | 0x00000000000d00 | |
| 80 | | |
| 96 | | |
| 112 | 0x0a000002 (10.0.0.2) | |
| 128 | | |
| 144 | | |
| 160 | | |
| 176 | | |
| 192 | 0x0a000003 (10.0.0.3) | |
| 208 | | |

FIG. 5B

| BIT OFFSET | 0 – 7 | 8 – 15 |
|---|---|---|
| 0 | 0x0001 | |
| 16 | 0x0800 | |
| 32 | 0x06 | 0x04 |
| 48 | 0X0002 (REPLY) | |
| 64 | 0x00000000000C00 | |
| 80 | | |
| 96 | | |
| 112 | 0x0a000003 (10.0.0.3) | |
| 128 | | |
| 144 | 0x00000000000d00 | |
| 160 | | |
| 176 | | |
| 192 | 0x0a000002 (10.0.0.2) | |
| 208 | | |

LINK LAYER ADDRESS RESOLUTION OF OVERLAPPING NETWORK ADDRESSES

TECHNICAL FIELD

The present invention relates in general to networking and in particular to the link layer address resolution of overlapping network addresses.

BACKGROUND

Computer networks are used to transmit and receive information between network-connected devices. Computer networks can include local area networks, wide area networks, or amalgamations of networks, such as what is known as the Internet. For example, computer networks are used in corporate data centers to connect large numbers of servers together. Such networks can use the Internet Protocol (IP) Suite to organize and format data that is sent across a network. One version of the IP suite is IPv4, which utilizes 32 bits for network addresses. Another version of the IP suite is IPv6, which utilizes 128 bits for network addresses.

Generally, devices on a network can have a link layer address and a network address. The link layer address can be a hardware address that is specific to a particular device or networking card. In the case of Ethernet, a link layer address can be a Media Access Control (MAC) address. A network address is a logical address, and can be configured for or assigned to a particular device. In the case of IP, the network address is an IP address. When a device sends a packet of data to another device, it generally needs both a link layer address and a network address to properly address the packet. The Address Resolution Protocol (ARP) can be used by devices to determine a link layer/hardware address associated with a network address.

An IP network can include multiple subnets. A subnet is defined based on a subnet mask. The subnet mask can indicate which network addresses are reachable directly by a device. Typically, other addresses must be reached by way of a gateway device, such as a network switch or a network router. When a packet is addressed to a network address outside of the local network and the packet is sent via a gateway device, the link layer address used can be the gateway device's link layer address.

SUMMARY

Disclosed herein are embodiments of methods, apparatuses, and systems relating to the link layer address resolution of overlapping network addresses.

One aspect of the disclosed embodiments is a method of link layer address resolution by a first device. The method includes receiving a first address resolution request from a second device, the first address resolution request having a sender network address and a target network address, wherein the target network address is an overlapping network address that is a gateway address of the second device and a network address of a third device and the second device is directly addressable from the third device, creating a first address resolution response having a sender link layer address associated with the first device, and sending the first address resolution response to the second device.

Another aspect of the disclosed embodiments is a network switch. The network switch comprises a memory and at least one processor configured to execute instructions stored in the memory to: receive a first address resolution request from a first device, the first address resolution request having a sender network address and a target network address, wherein the target network address is an overlapping network address that is a gateway address of the first device and a network address of a second device and the second device is directly addressable from the third device, create a first address resolution response having a sender link layer address associated with the network switch, and send the first address resolution response to the first device.

Another aspect of the disclosed embodiments is a network system. The network system includes a network switch having at least one processor, at least one memory, and a plurality of network ports, the network switch operable to forward network packets between at least some of the plurality of network ports, a plurality of devices, at least some devices of the plurality of devices each connected to at least one of the plurality of network ports and configured with a network address and a gateway address, and at least one link layer address resolver capable of resolving the gateway address of at least one device of the plurality of devices to a link layer address associated with the network switch when that gateway address is also used as a network address for another device of the plurality of devices.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein:

FIG. 5A is a chart of an ARP packet as used in the network system of FIG. 1 in accordance with one embodiment;

FIG. 5B is a chart of an exemplary ARP request from a device to a network switch within the network system of FIG. 1 in accordance with one embodiment; and FIG. 5C is a chart of an exemplary ARP response from a network switch to a device within the network system of FIG. 1 in accordance with one embodiment.

DETAILED DESCRIPTION

Figure 1:
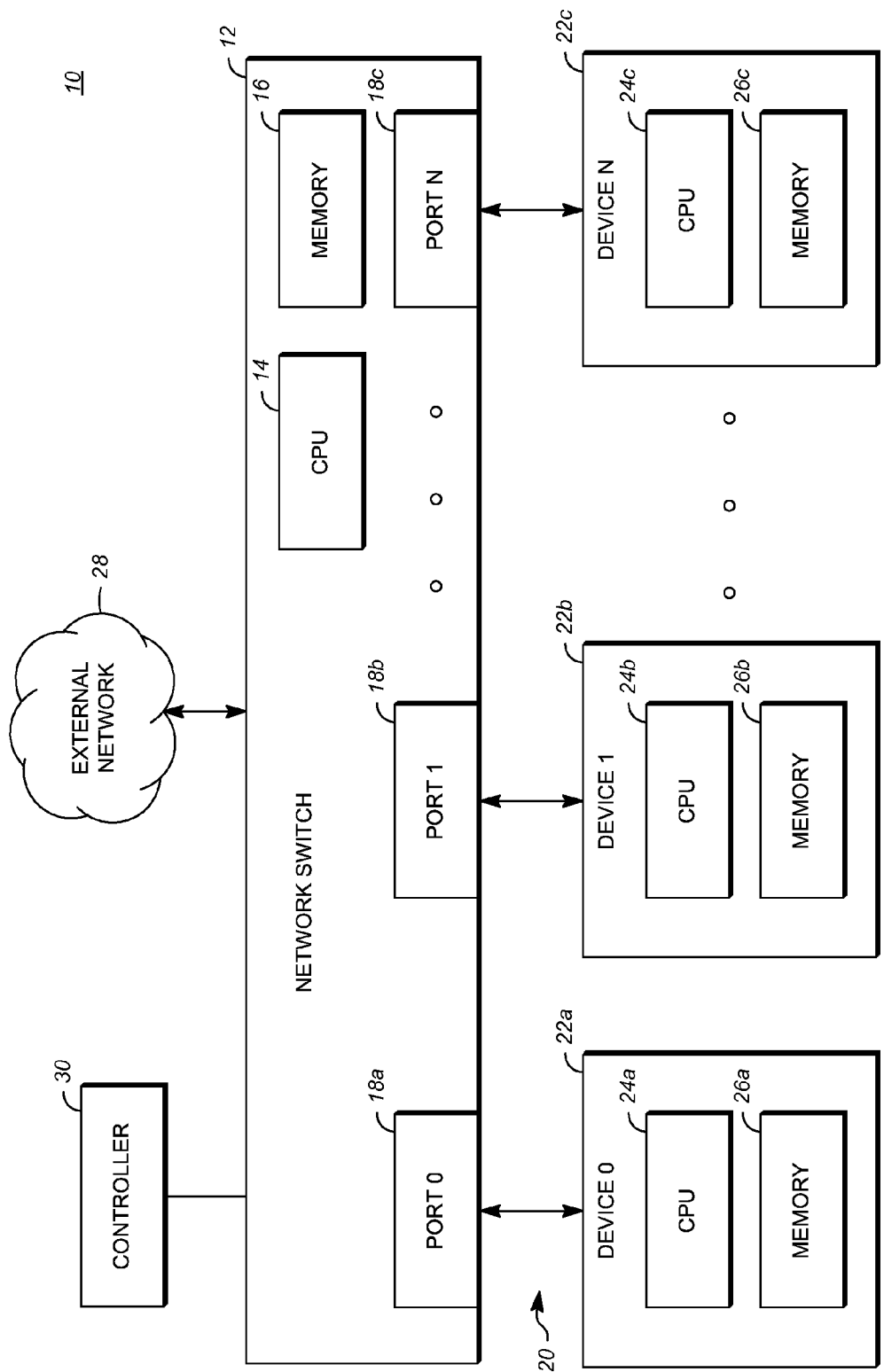
FIG. 1 is a block diagram of a network system in accordance with one embodiment.

There are many potential configurations of an IP network. One configuration can be referred to as "single subnet." In a single subnet configuration, multiple devices are configured to be on the same logical subnet. In order for one of the multiple devices to communicate with another of the multiple devices, it will broadcast a link layer resolution request to determine the link layer address of the other device. If a large number of devices initiates communications with other devices (i.e. if a large number of devices are restarted and they lose their cache of link layer addresses), the volume of broadcast requests can cause degraded network performance. Also, the additional memory required for storage of the link layer addresses of devices on the single subnet and the delay of relearning link layer addresses when the connection state of devices change can also impact performance.

Another configuration can be referred to as a "per-port subnet." In a per-port subnet configuration, each device is configured to be on its own subnet. Each device communicates directly with a network switch (or other intermediary device) that routes data sent by the devices to the appropriate destination. Since each device is on its own subnet, the volume of broadcasts reaching each device is reduced. One reason is that each device need only know the link layer address of the network switch to send data to any destination. However, unlike the single subnet configuration, a per-port subnet configuration requires the use of substantially more network addresses, since the network switch must have an assigned network address for each subnet. In certain configurations, each device subnet may consume up to four network addresses (such as when a 30 bit subnet mask is utilized in an IPv4 system).

For example, in a 24 bit IPv4 subnet, there are 256 ($2^8$) potential addresses. In the per-port subnet configuration, 254 addresses are typically usable for devices, with the first address (0) reserved as a "network address" and the last address (256) reserved for network broadcasts. In the single subnet configuration, each device consumes two or four network addresses, depending on whether a 30 or 31 bit subnet mask is used. In the 30 bit subnet mask example, each subnet is allocated four network addresses (one for the device, one for the network switch, and the two reserved addresses). In the 31 bit subnet mask example, each subnet is allocated two network addresses (i.e. no reserved addresses). In these configurations, either 128 or 64 network addresses out of the 256 are usable for devices.

Unlike the above examples, the techniques and configurations described below can be used to reduce broadcast volume seen by each device without the loss of usable network addresses. In other words, all 256 addresses in a 24 bit IPv4 subnet can be assigned to devices while still using the network switch to route data sent by the device. This can be achieved by use of 31 bit subnets and by reusing the IP addresses that normally would be allocated to the network switch (or other intermediary device) so that the devices are configured to be included in overlapping point-to-point subnets having overlapping network addresses. These techniques and configurations can be used, for example, in a data center environment.

FIG. 1 is a block diagram of a network system 10. The network system 10 includes a network switch 12. Network switch 12 includes a CPU 14 and a memory 16. CPU 14 can be a controller for controlling the operations of network switch 12. The CPU 14 is connected to memory 16 by, for example, a memory bus. Memory 16 can include random access memory (RAM) or any other suitable memory device. Memory 16 can store data and program instructions which are used by the CPU 14.

Network switch 12 includes network ports 18a-c. Network ports 18a-c are usable for connecting the network switch 12 to devices 22a-c via a local network 20. The connections for local network 20 can be made using a number of techniques, including category 5 cabling or fiber optics. Other techniques may be alternatively used for the connections of local network 20. Devices 22a-c each include CPUs 24a-c and memories 26a-c. CPUs 24a-c can include controllers for controlling the operations of devices 22a-c. At least some of the CPUs 24a-c are connected to memories 26a-c by, for example, memory buses. Memories 26a-c can include random access memories (RAM) or any other suitable memory devices. Memories 26a-c can store data and program instructions which are used by the CPUs 24a-c.

Network switch 12 can also be connected to external network 28. The connection to external network 28 can be through one or more network ports (not shown). Alternatively, there may be one or more ports on network switch 12 specifically configured to connect to external network 28. The above description is of only one implementation of network system 10, network switch 12, and devices 22a-c, and other implementations are contemplated. For example, additional or less devices can be connected to network switch 12. In another example, the CPU and memory of network switch 12 can be implemented on a System on a chip (SoC).

In one implementation, network switch 12 is connected to a controller 30. Controller 30 can also be connected to additional network switches. Controller 30 can also include a CPU and/or a memory (not shown). Alternatively, controller 30 can be implemented within network switch 12. Controller 30 can be configured to manage network switch 12 and to perform some tasks associated with network switch 12. For example, network switch 12 can be configured to process most network traffic without using controller 30. However, network switch 12 can also be configured to forward certain network traffic to controller 30. The configuration can be pre-determined or can be controlled by controller 30. In one example, network switch 12 can forward address resolution traffic to controller 30. Controller 30 can then be configured to process the address resolution traffic and to create address resolution responses in accordance with the techniques described below.

Although FIG. 1 depicts that processors 14, 24a-c and memory 16, 26a-c are integrated into single units, this depiction is exemplary only. The operations of network switch 12 and/or devices 22a-c can be distributed across multiple processors on the same machine or different machines or across a network such as a local area network, wide area network or the Internet and the terms "network switch" and "device" can encompass such multi-machine systems. Memories 16, 26a-c can also be integral units (such as the RAM within a computer) or can be distributed across multiple machines such as a network-based memory or memory in multiple machines performing the operations of network switch 12 and/or devices 22a-c.

Figure 2:
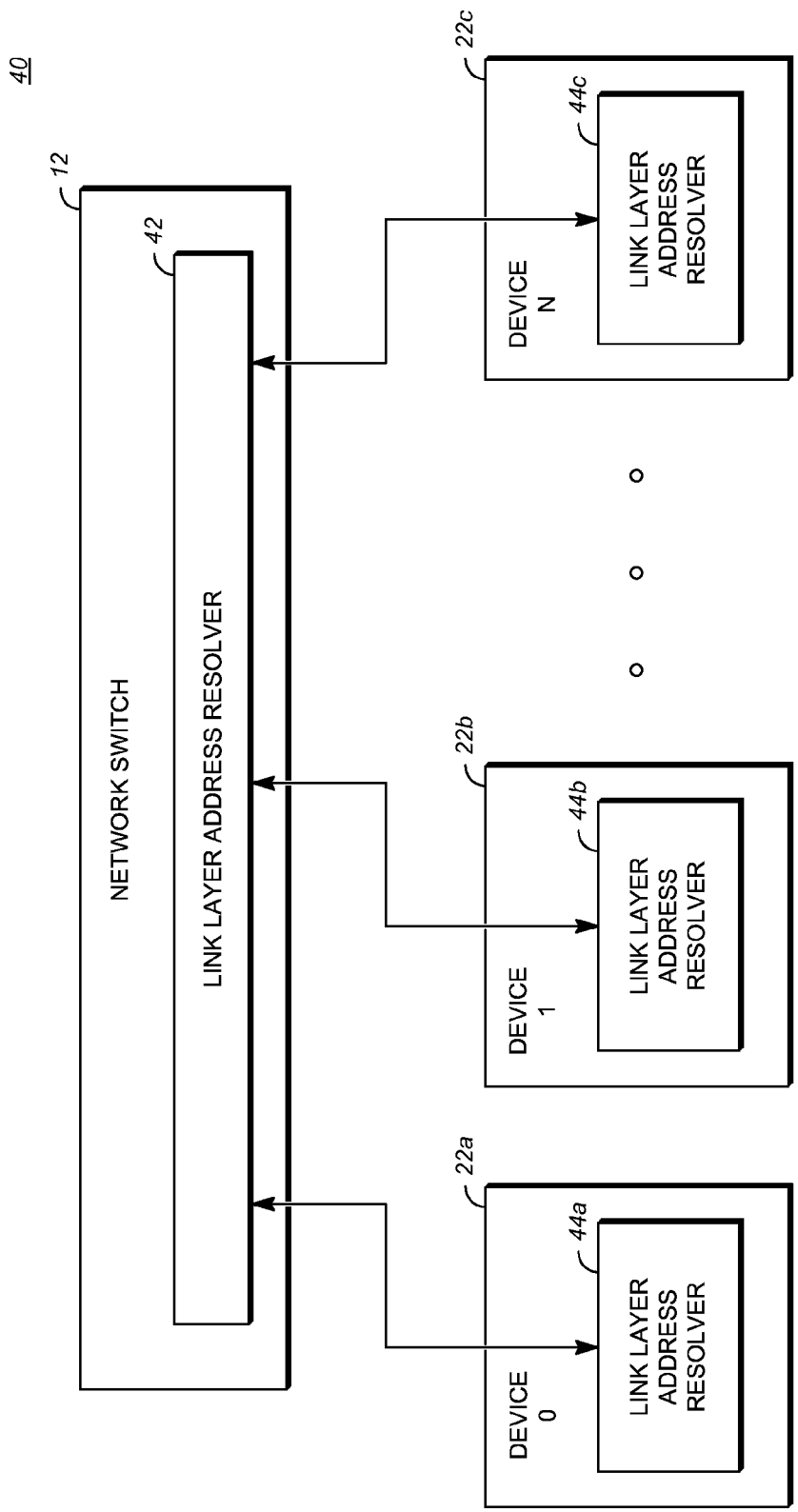
FIG. 2 is a block diagram illustrating link layer address resolution components of the network system of FIG. 1 in accordance with one embodiment.

FIG. 2 is a block diagram 40 illustrating link layer address resolution components of the network system 10 of FIG. 1. The block diagram 40 includes network switch 12 and devices 22a-c. Network switch 12 includes a link layer address resolver 42. Devices 22a-c include link layer address resolvers 44a-c. The link layer address resolvers 42 and 44a-c are configured to provide the link layer address of their associated network switch or device in response to a link layer address resolution request containing a network address that is associated with the associated network switch or device.

In a typical example, device 22a is to send data to device 22b using Transmission Control Protocol over IP (TCP/IP). Device 22a can obtain device 22b's network address through various means, including a static configuration file or a network address lookup service, such as Domain Name System (DNS). In order to send data via TCP/IP to device 22b, device 22a needs both the network address and the link layer address of device 22b. Device 22a can use a link layer address resolution protocol, such as ARP, to obtain the link layer address of device 22b.

In the typical example, link layer address resolver 42a of device 22a broadcasts ARP packets to all devices on its local network subnet. The ARP packet includes the network address of device 22b. When link layer address resolver 42b of device 22b receives the ARP packet, it checks to see if the network address in the ARP packet matches a network address of device 22b. When it matches, device 22b sends an ARP reply packet back to device 22a with the link layer address of device 22b.

In a similar example, device 22a is a part of a point-to-point subnet (i.e. /31 subnet) with network switch 12. As such, traffic to device 22b will be sent via a gateway address, which is the network switch 12. In this case, the ARP packet would include the network address of network switch 12. When link layer address resolver 42 of network switch 12 receives the ARP packet, it checks to see if the network address in the ARP packet matches a network address of network switch 12. When it matches, network switch 12 sends an ARP reply packet back to device 22a with the link layer address of network switch 12.

To achieve full usage of network addresses, the configuration of link layer address resolver 42 can be modified to permit the reuse of network addresses that would normally be allocated to the network switch 12 as described in the last example. For example, technique 50 as described below with respect to FIG. 3 can be utilized to provide link layer address resolution to devices without the need for assigning network addresses to the network switch. Correspondingly, the network addresses not assigned to the network switch can be "reused" for other devices.

In an implementation, some or all of devices 22 and other devices accessible, for example, via external network 28 can be directly addressable. A directly accessible device can be accessed by another device using the directly accessible device's network address. A device can be made to not be directly accessible by use of, for example, intermediate proxy, firewall, or NAT (Network Address Translation) devices. For example, in the case of NAT, multiple devices can be indirectly addressed via a single network address by use of, for example, TCP port mapping.

Figure 3:
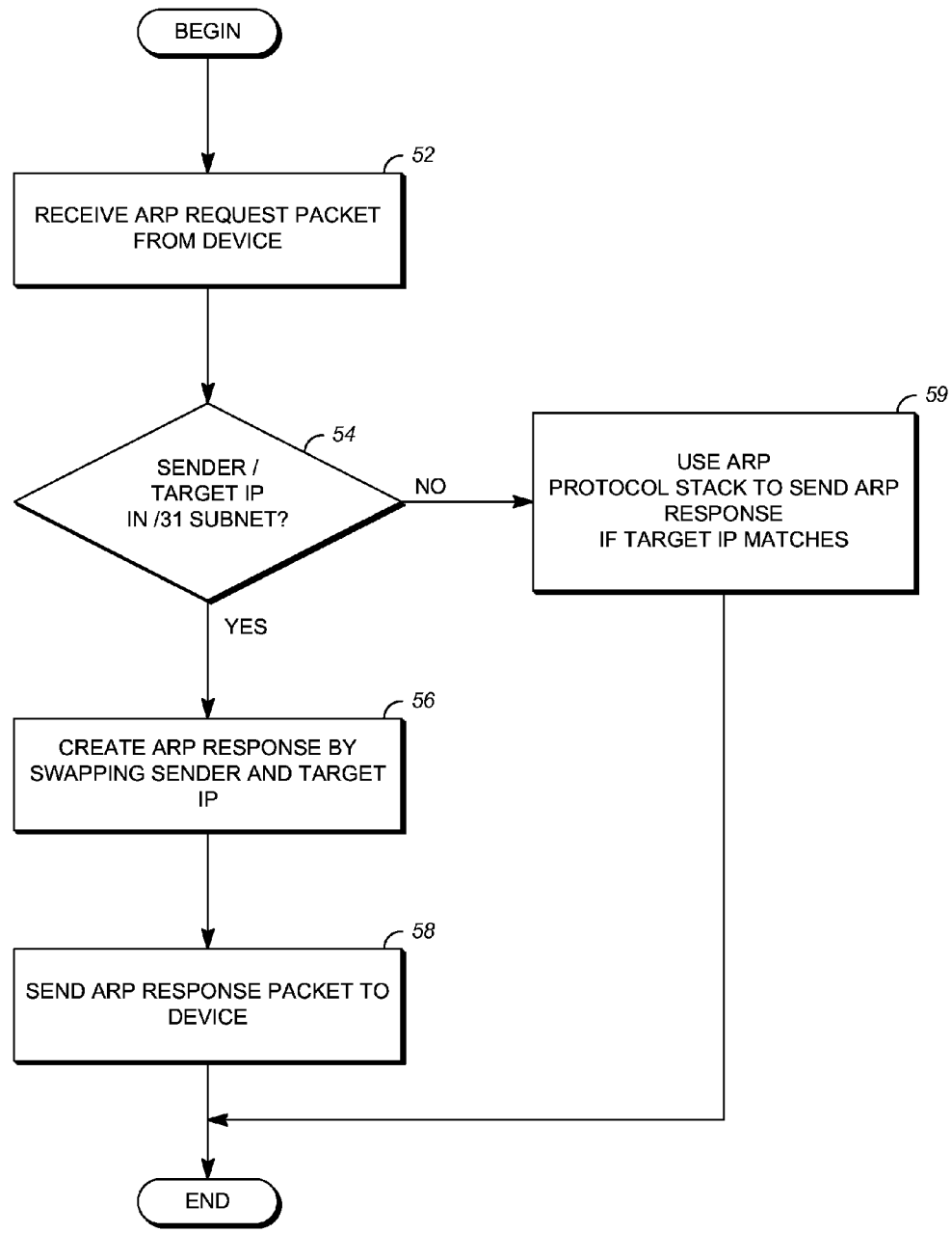
FIG. 3 is a flowchart of a technique of link layer address resolution by a network switch within the network system of FIG. 1 in accordance with one embodiment.

FIG. 3 is a flowchart of a technique 50 of link layer address resolution by a network switch within the network system of FIG. 1 in accordance with one embodiment. Starting at stage 52, a network switch (such as network switch 12) receives an ARP request packet from a device (such as device 22a). Network switch 12 identifies whether the ARP request packet includes network addresses configured to be overlapping network addresses by identifying whether the sender and target IP addresses in the ARP request packet are in a /31 (31 bit) subnet at stage 54.

If the addresses are in a /31 subnet, then the ARP response is created by swapping the sender and target IP addresses at stage 56. One reason that the IP addresses are swapped is to avoid having to assign an IP address to the network switch for /31 subnets. In other words, in at least one implementation, network switch 12 will not have an IP address to match to the ARP request for typical handling of the ARP request.

In addition to swapping the IP addresses, network switch 12 will also include a MAC address associated with the network switch 12 in the ARP response. In one implementation, the MAC address will be that of the network switch port that the ARP request is received on. However, in other implementations, different MAC addresses can be used. For example, a common, pre-determined MAC address can be used. This can be done since network switch 12 will route or forward all packets received from /31 subnet devices. As used herein, the terms "route" and "forward" are used interchangeably. Thus, the network switch does not need a "valid" MAC address for packets received from those devices so long that it is configured to detect the common, pre-determined MAC address or if it is configured to route all packets received from /31 subnet devices (regardless of the MAC address included in those packets).

Once the ARP response is created, it is sent to the device at stage 58, and then technique 50 completes. Referring back to stage 54 of technique 50, if the addresses are not in a /31 subnet, control passes to stage 59. At stage 59, the network switch 12 uses an ARP protocol stack to send an ARP response if the target IP matches an IP address configured for the network switch 12. Alternatively, network switch 12 routes or forwards the ARP request packet to one or more other devices or networks if the target IP does not match. Once the ARP response is sent or the ARP request is routed or forwarded, technique 50 completes.

Other implementations of technique 50 are also possible, including those that add, remove, modify, or combine the stages of technique 50 shown. For example, identification of IP addresses using /31 subnets may not be based on the subnet itself in stage 54. In an alternative implementation, the detection can be based on any number of other criteria, including a pre-configured range of IP addresses or the network port that the ARP request is received on. In another alternative implementation, stages 54 and 59 can be omitted, and the modified ARP response technique shown in stages 52, 56, and 58 can be utilized. In another alternative implementation, stage 54 can identify whether the network addresses are configured to be overlapping network addresses based on network port or criteria other than whether the network addresses are in a /31 subnet. In such an implementation, overlapping network addresses can be utilized in subnets other than a /31 subnet, such as a /30 subnet.

Technique 50 as described above can be implemented on network switch 12 and permits use of devices that have an unmodified network stack and/or configuration. In an alternative implementation, the use of overlapping network addresses can also be accomplished by modification of devices 22a-c instead of network switch 12. The network switch 12 can remain unmodified and the devices 22a-c can be configured with static ARP entries corresponding to one or more MAC addresses of the network switch. The MAC address(es) of the network switch stored can correspond to actual MAC addresses of network switch ports or can be a generic link layer address recognizable by the network switch. This alternative technique also provides the reduction of broadcast traffic to each device while still maximizing network address usability.

While technique 50 has been described with respect to an IPv4 implementation utilizing the ARP protocol and MAC addresses, technique 50 can also be used in various other implementations. In one alternative implementation, technique 50 can be used on an IPv6 network utilizing the Neighbor Discovery Protocol (NDP). In another alternative implementation, technique 50 can be used on physical mediums that use a link layer addressing scheme other than MAC addresses.

Figure 4:
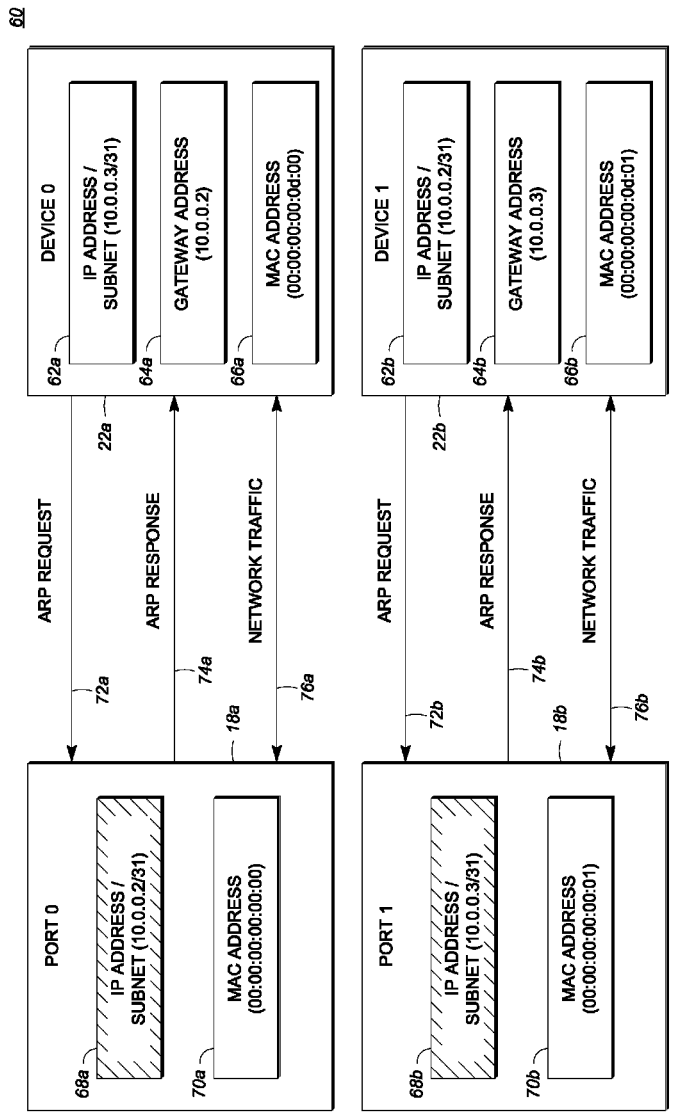
FIG. 4 is a block diagram illustrating an exemplary implementation of the network system of FIG. 1 using the technique of FIG. 3 in accordance with one embodiment.

FIG. 4 is a block diagram 60 illustrating an exemplary implementation of the network system 10 of FIG. 1 using the technique 50 of FIG. 3 in accordance with one embodiment. Devices 22a,b are configured with IP addresses/subnets 62a,b, gateway addresses 64a,b, and MAC addresses 66a,b. In accordance with stages 54-58 of technique 50, the subnets of devices 22a,b are /31 (31 bit) subnets. The IP address of device 0 22a is 10.0.0.3 and the IP address of device 1 22b is 10.0.0.2. These IP addresses are in the same /31 subnet. However, with the use of technique 50, the traffic from device 0 22a and device 1 22b is routed and forwarded separately by network switch 12 as if devices 22a,b were in different subnets.

To perform technique 50, network switch 12 (and/or controller 30) includes routing functionality to enable forwarding of network packets to ports of network switch 12 associated with destination devices of each of the network packets. Routing is necessary when a destination link layer address of a network packet is associated with network switch 12 and a destination network address of the network packet is associated with another device connected to network switch 12. In some cases, the other device may be connected to network switch 12 through one or more intermediary devices such as other network switches. Routing functionality can be implemented through, for example, a routing table. In one implementation, a routing table can include entries that map network addresses to ports of network switch 12 to enable routing. Other implementations are also possible.

The gateway addresses 64a,b are configured to be the other address in the /31 subnet even though the other address is used by the other device. Gateway addresses 64a,b are configured in the devices 22a,b to allow the devices 22a,b to operate using a unmodified IP network stack. In other words, the devices 22a,b can use link layer address resolvers 44a,b to determine a link layer address of gateway addresses 64a,b. The resolved link layer addresses of gateway addresses 64a,b are used when sending data to a network address outside of the /31 subnet.

The MAC addresses 66a,b are typically associated permanently with the link layer of devices 22a,b. However, in some implementations, MAC addresses 66a,b can be changeable. MAC addresses 66a,b enable communication over Ethernet-type networks.

Ports 18a,b of network switch 12 are shown with IP address/subnet placeholders 68a,b. Ports 18a,b typically are not actually configured with the IP addresses and subnets shown by IP address/subnet placeholders 68a,b. However, through the use of technique 50 (i.e. stage 56), ports 18a,b can have the appearance of being configured using the IP address and subnets shown by placeholders 68a,b. Ports 18a,b also can be configured with MAC addresses 70a,b. However, in some implementations, MAC addresses 70a,b can be omitted from ports 18a,b.

To resolve the link layer addresses of gateway addresses 64a,b, devices 22a,b can send ARP requests 72a,b to ports 18a,b. In one implementation, the ARP requests 72a,b are created and sent using link layer address resolvers 44a,b. Ports 18a,b can be configured to receive the ARP requests 72a,b in accordance with technique 50. In one implementation, the ARP requests 72a,b are received by link layer address resolver 42. ARP responses 74a,b can be created and sent responsive to ARP requests 72a,b in accordance with technique 50. For example, MAC addresses 70a,b can be included in ARP responses 74a,b even though ports 18a,b are not configured with IP addresses matching ARP requests 72a,b. In one implementation, the ARP responses 74a,b can be created by link layer address resolver 42.

Once devices 22a,b receive ARP responses 74a,b, they will have the link layer address needed to send data to the network via network switch 12. Correspondingly, devices 22a,b and ports 18a,b can start exchanging network traffic 76a,b.

FIG. 5A is a chart of an ARP packet 90 as used in the network system 10 of FIG. 1 in accordance with one embodiment. ARP packet 90 can include fields such as hardware type (HTYPE), protocol type (PTYPE), hardware address length (HLEN), protocol address length (PLEN), operation (OPER), sender hardware address (SHA), sender protocol address (SPA), target hardware address (THA), and target protocol address (TPA). ARP packet 90 can be used for both ARP requests and ARP responses, dependent on a value indicated in the OPER field. Typically an ARP request can omit a value for the THA field, as the purpose of the ARP request is to determine the hardware (link layer) address associated with the target protocol address (TPA) (i.e. IP address).

FIG. 5B is a chart of an exemplary ARP request 72a from a device 22a to a network switch 12 within the network system 10 of FIG. 1 in accordance with one embodiment. ARP request 72a includes a OPER field 92 that contains a value of 0x0001 indicating that ARP request 72a is a request packet. SHA field 94 is included with the hardware address (i.e. MAC address) of device 22a (i.e. 0x000000000d00). SPA field 96 is included with the network address (i.e. IP address) of device 22a (i.e. 10.0.0.2). THA field 98 is left blank, as the purpose of ARP request 72a is to obtain a hardware address associated with a target network address. Correspondingly, TPA field 100 is included with a target network address (i.e. 10.0.0.3) for which a hardware address is being sought.

FIG. 5C is a chart of an exemplary ARP response 74a from a network switch 12 to a device 22a within the network system 10 of FIG. 1 that is created using the technique 50 of FIG. 3 in accordance with one embodiment. ARP response 74a includes a OPER field 110 that contains a value of 0x0002 indicating that ARP response 74a is a response packet. SHA field 112 is included with the hardware address (i.e. MAC address) associated with network switch 12 (i.e. 0x000000000c00). SHA field 112 is in effect the response to ARP request 72a. SPA field 114 is included with the network address (i.e. IP address) that is "associated" with network switch 12 (i.e. 10.0.0.3). It is obtained from TPA field 100 of ARP request 72a in accordance with technique 50. Values for THA field 116 (i.e. 0x000000000d00) and TPA field 118 (i.e. 10.0.0.2) are obtained respectively from SHA field 94 and SPA field 96 of ARP request 72a, also in accordance with technique 50.

Network switch 12 and/or devices 22a-c (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing hardware, either singly or in combination. The terms "signal" and "data" are used interchangeably. Further, portions of network switch 12 and/or devices 22a-c do not necessarily have to be implemented in the same manner.

Further, in one example, network switch 12 and/or devices 22a-c can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein. Other suitable network switch 12 and/or devices 22a-c implementation schemes are also available.

Implementations or portions of implementations of the above disclosures can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, an electronic, magnetic, optical, electromagnetic, or a semiconductor device. Other suitable mediums are also available. Such computer-usable or computer-readable media can be referred to as non-transitory media, and may include RAM or other volatile memory or storage devices that may change over time.

The exemplary approaches herein have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of link layer address resolution by a first device, the method comprising:
   receiving a first address resolution request from a second device, the first address resolution request having a sender network address and a target network address, wherein the target network address is an overlapping network address that is a gateway address of the second device and a network address of a third device and the second device is directly addressable from the third device;
   creating a first address resolution response having a sender link layer address associated with the first device; and
   sending the first address resolution response to the second device, wherein the sender network address and the target network address of each of the response and the request are equal except for their least significant bit.

2. The method of claim 1, wherein the sender network addresses and the target network addresses each include 32 bits.

3. The method of claim 1, wherein the first address resolution request is sent using an Internet Protocol network stack and wherein the first address resolution request and the first address resolution response are each formatted using Address Resolution Protocol.

4. The method of claim 3, further comprising:
   receiving a second address resolution request from the third device, the second address resolution request having a sender network address equal to the target network address of the first address resolution request.

5. The method of claim 4, wherein the sender network addresses and target network addresses are within a point-to-point subnet.

6. The method of claim 4, wherein the first device is not configured with the target network address of either the first address resolution request or the second address resolution request.

7. The method of claim 6, wherein the first device is configured with a management network address to enable configuration of the first device.

8. The method of claim 1, wherein the first device has a plurality of network ports, the method further comprising:
   receiving a network packet from the second device, the network packet addressed to a network address not associated with the first device and addressed to a link layer address associated with the first device; and
   sending the network packet to one of the plurality of network ports that is associated with the network address that the network packet is addressed to.

9. The method of claim 8, wherein the network packet is addressed to the third device.

10. The method of claim 1, wherein receiving the first address resolution request from the second device comprises:
    identifying that the target network address is configured to be an overlapping network address if the target network address is a part of a point-to-point subnet or if a configuration of a network port of the first device that the second device is connected to indicates that the second device uses an overlapping network address.

11. The method of claim 1, wherein the link layer address associated with the first device is one of a link layer address of a port of the first device, a pre-determined link layer address, or a generic link layer address.

12. The method of claim 1, wherein the first device is associated with a controller that is configured to create the first address resolution response.

13. A network switch comprising:
    at least one memory; and
    at least one processor configured to execute instructions stored in the at least one memory to:
       receive a first address resolution request from a first device, the first address resolution request having a sender network address and a target network address, wherein the target network address is an overlapping network address that is a gateway address of the first device and a network address of a second device and the second device is directly addressable from the first device,
       create a first address resolution response having a sender link layer address associated with the network switch, and
       send the first address resolution response to the first device, wherein the sender network address and the target network address of each of the response and the request are equal except for their least significant bit.

14. The network switch of claim 13, wherein the memory further includes instructions to:
    receive one or more additional address resolution requests from a one or more additional devices, the one or more additional address resolution requests having at least one sender network address equal to the target network address of the first address resolution request or another one of the additional address resolution requests.

15. The network switch of claim 13, wherein the instructions to create the first address resolution response do not require the network switch to be configured with a network address.

16. The network switch of claim 15, wherein the link layer address is a generic address that the network switch is configured to recognize for accepting network packets for routing.

17. A network system comprising:
    a network switch having at least one processor, at least one memory, and a plurality of network ports, the network switch operable to forward network packets between at least some of the plurality of network ports;
    a plurality of devices, at least some devices of the plurality of devices each connected to at least one of the plurality of network ports and configured with a network address and a gateway address; and
    at least one link layer address resolver capable of resolving the gateway address of at least one device of the plurality of devices to a link layer address associated with the network switch when that gateway address is also used as a network address for another device of the plurality of devices, wherein the network address and gateway address of at least some of the plurality of devices are within a point-to-point subnet, the link layer address resolver is incorporated into a controller and the link layer address resolver is configured to generate an address resolution response including the link layer address associated with the network switch, the address resolution response being generated in response to an address resolution request sent by one of the plurality of devices, wherein a sender network address and a target network address of each of the response and the request are equal except for their least significant bit.

18. The network system of claim 17, wherein the link layer address resolver is configured to generate the address resolution response by swapping the sender network address and the target network address of the address resolution request.

19. The network system of claim 17, wherein the link layer address resolver is incorporated into at least some of the plurality of devices, the link layer address resolver including a generic link layer address usable for all network packets having an overlapping network address sent via the network switch.

20. The network system of claim 17, wherein the link layer address resolver is incorporated into at least some of the plurality of devices, the link layer address resolver including at least one pre-determined entry identifying the link layer address of the network switch associated with the gateway address.

* * * * *